(12) United States Patent
Croxford et al.

(10) Patent No.: US 11,423,645 B2
(45) Date of Patent: Aug. 23, 2022

(54) IMAGE PROCESSING

(71) Applicants: Apical Limited, Cambridge (GB); Arm Limited, Cambridge (GB)

(72) Inventors: Daren Croxford, Cambridge (GB); Roberto Lopez Mendez, Cambridge (GB); Madhusudan Eyunni, Cambridge (GB)

(73) Assignees: Apical Limited, Cambridge (GB); Arm Limited, Cambridge (GB)

( * ) Notice: Subject to any disclaimer, the term of this patent is extended or adjusted under 35 U.S.C. 154(b) by 225 days.

(21) Appl. No.: 16/507,430

(22) Filed: Jul. 10, 2019

(65) Prior Publication Data
US 2020/0034615 A1 Jan. 30, 2020

(30) Foreign Application Priority Data
Jul. 26, 2018 (GB) ...................................... 1812181

(51) Int. Cl.
| | |
|---|---|
| G06K 9/00 | (2022.01) |
| G06E 1/00 | (2006.01) |
| G06V 20/00 | (2022.01) |
| G06K 9/62 | (2022.01) |
| G06F 9/50 | (2006.01) |
| G06N 3/04 | (2006.01) |
| G06T 7/70 | (2017.01) |

(52) U.S. Cl.
CPC .............. *G06V 20/00* (2022.01); *G06F 9/505* (2013.01); *G06K 9/6267* (2013.01); *G06N 3/04* (2013.01); *G06T 7/70* (2017.01)

(58) Field of Classification Search
USPC ....... 382/100, 103, 155–159, 181, 224, 232, 382/276, 279, 302, 305, 291; 706/20
See application file for complete search history.

(56) References Cited

U.S. PATENT DOCUMENTS

| | | | | |
|---|---|---|---|---|
| 9,495,618 B1* | 11/2016 | Tabb | ..................... | G06V 30/194 |
| 9,928,605 B2* | 3/2018 | Bleiweiss | ............ | G06V 30/194 |
| 2016/0267358 A1* | 9/2016 | Shoaib | ................. | G06K 9/6271 |

(Continued)

FOREIGN PATENT DOCUMENTS

| | | |
|---|---|---|
| CN | 108062518 A | 5/2018 |
| CN | 108491897 A | 9/2018 |

(Continued)

OTHER PUBLICATIONS

United Kingdom Combined Search and Examination Report dated Jan. 21, 2019 for GB Application No. GB1812181.4.
(Continued)

*Primary Examiner* — Seyed H Azarian
(74) *Attorney, Agent, or Firm* — EIP US LLP

(57) ABSTRACT

A local object classifier using a set of object definitions to perform object classification in image frames. The local object classifier is arranged to detect an object in an image frame and determine whether to transmit image data for the detected object to a remote object classifier. In response to said determining, the local object classifier is arranged to transmit image data, derived from the image data representative of the image frame, to the remote object classifier. The local object classifier is also arranged to receive object data, representative of the detected object, from the remote object classifier.

18 Claims, 3 Drawing Sheets

(56) References Cited

U.S. PATENT DOCUMENTS

| | | | |
|---|---|---|---|
| 2018/0089497 A1* | 3/2018 | Romanenko | G06V 10/255 |
| 2019/0280869 A1* | 9/2019 | Streit | H04L 9/008 |
| 2020/0193299 A1* | 6/2020 | Geva | G06V 10/82 |

FOREIGN PATENT DOCUMENTS

| | | |
|---|---|---|
| GB | 2554435 A | 4/2018 |
| WO | 2016089577 A1 | 6/2016 |

OTHER PUBLICATIONS

Examination Report dated Oct. 14, 2020 for GB Application No. GB1812181.4.

* cited by examiner

IMAGE PROCESSING

CROSS-REFERENCE TO RELATED APPLICATIONS

This application claims the benefit under 35 U.S.C. § 119(a) and 37 CFR § 1.55 to United Kingdom patent application no. GB1812181.4 filed on Jul. 26, 2018, the entire content of which is incorporated herein by reference.

BACKGROUND OF THE INVENTION

Field of the Invention

The present disclosure relates to methods and apparatus for processing image data.

Description of the Related Technology

Methods to process image data, for example to detect characteristics of images such as features or objects in the images, may be computationally intensive. There is thus a need for more efficient methods of detecting characteristics of images.

SUMMARY

According to a first aspect of the present disclosure, there is provided an image processing system comprising:
an image data interface arranged to receive first image data representative of an image frame;
a first, local, object classifier arranged to perform object classification in the image frame; and
storage arranged to store categorization data comprising a set of object definitions for use during object classification;
wherein the first object classifier is arranged to:
detect an object in the image frame;
determine whether to transmit image data for the detected object to a second, remote, object classifier;
in response to said determining:
transmit second image data, derived from the first image data, to the second object classifier; and
receive object data, representative of the detected object, from the second object classifier.

According to a second aspect of the present disclosure, there is provided a method of image processing comprising:
obtaining first image data representative of an image frame;
storing categorization data comprising a set of object definitions for use during object classification;
processing the first image data using a first, local, object classifier to perform object classification in the image frame;
detecting an object in the image frame;
determining whether to transmit image data for the detected object to a second, remote, object classifier; and
in response to said determining:
transmitting second image data, derived from the first image data, to the second object classifier; and
receiving object data, representative of the detected object, from the second object classifier.

According to a third aspect of the present disclosure, there is provided a non-transitory computer-readable storage medium storing instructions that, when executed by a processor, cause the processor to:
receive first image data representative of an image frame;
store first categorization data, comprising a set of object definitions for use during object classification, in storage;
process the first image data using a first, local, object classifier to perform object classification in the image frame;
detect an object in the image frame;
determine whether to transmit image data for the detected object to a second, remote, object classifier; and
in response to said determining:
transmit second image data, derived from the first image data, to the second object classifier; and
receive object data, representative of the detected object, from the second object classifier.

Further features and advantages will become apparent from the following description of examples which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
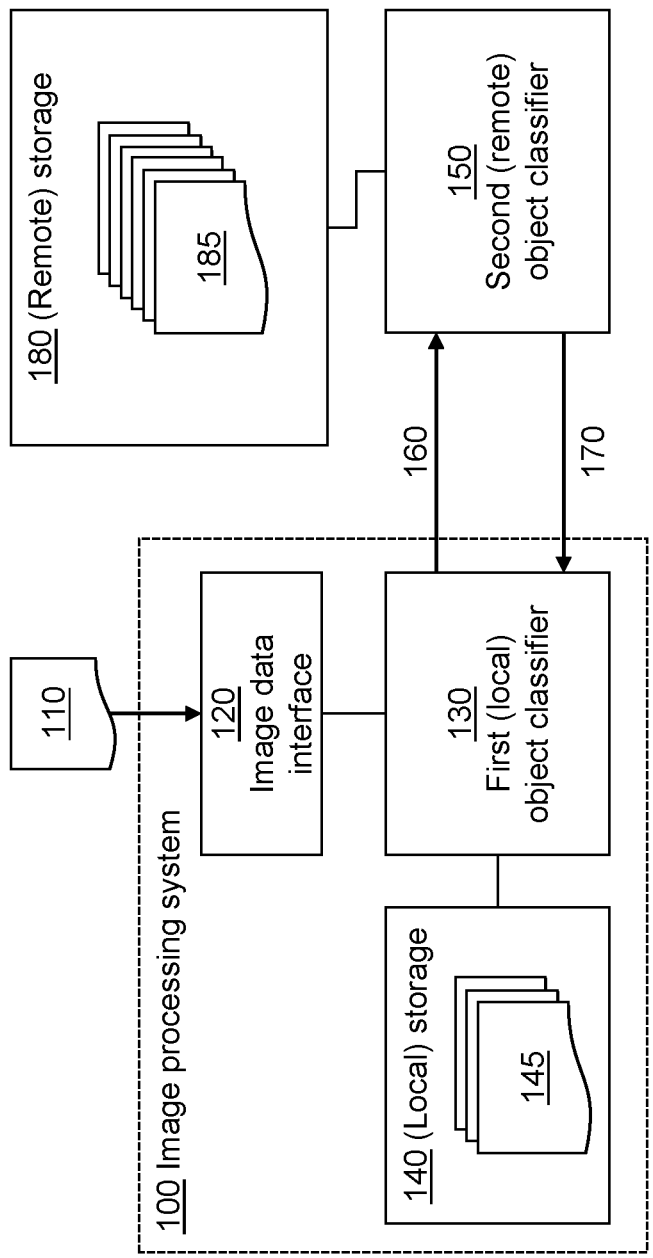
FIG. 1 schematically shows a local object classifier, as part of an image processing system, interacting with a remote object classifier, according to examples.

Methods described herein relate to processing image data representative of at least part of an image using an image processing system. An example image processing system 100 is shown in FIG. 1. The image processing system 100 includes an image data interface 120 arranged to receive first image data 110 representative of, e.g. in the form of, an image frame. In examples, the image data interface 120 may receive sequential image frames, e.g. representing a dynamic scene.

The first image data 110 may, for example, be image data captured using an image sensor, e.g. a camera. The image data may represent at least one characteristic of the light captured by the image sensor, such as an intensity of the light captured by each sensor pixel, which may be proportional to the number of photons captured by that sensor pixel. The intensity may represent a luminance of the captured light, which is for example a measure of the intensity of light per unit area rather than an absolute intensity. In other examples, the image data may be representative of a brightness of captured light, which may be considered to correspond to a perception of a luminance, which may or may not be proportional to the luminance. In general, the image data may represent any photometric quantity or characteristic that may be used to represent the visual appearance of the image represented by the image data, or may be derived from any such photometric quantity or characteristic. The image data may be in any suitable format, such as a raw image format. For example, the image data may be streamed from the image sensor, with or without being saved to a framebuffer, without saving the raw image data to memory. In such cases, image data obtained after processing of the raw image data may, however, be written to memory.

A first, local, object classifier 130 may be arranged to perform object classification in the image frame. In examples in which the image data interface 120 receives sequential image frames, the first object classifier 130 may perform object classification in a selected image frame. The first object classifier 130 may be implemented as computer software instructions executed in at least one multi-purpose data processor such as a CPU (central processing unit) or GPU (graphics processing unit), and/or specially-configured hardware computer vision data processors.

The image processing system 100 may include storage 140, for example a random access memory (RAM) such as dynamic RAM (DRAM), synchronous DRAM (SDRAM), or double data rate SDRAM (DDR-SDRAM). In other examples, the storage 140 may be, or include, a non-volatile memory such as Read Only Memory (ROM) or a solid state drive (SSD) such as Flash memory. The storage 140 in examples may include further storage devices, for example magnetic, optical or tape media, compact disc (CD), digital versatile disc (DVD) or other data storage media. The storage 140 may be removable or non-removable from the image processing system 100.

The storage 140 may be arranged to store categorization data, the categorization data comprising a set of object definitions for use by the first object classifier 130 during object classification. The set of object definitions may be arranged in an object definition hierarchy including at least a first group of coarse-level object definitions at a first object definition level and a second group of finer-level object definitions at a second object definition level which is below the first object definition level. Alternatively, the set of object definitions may be arranged in a flat structure or other non-hierarchical structure, e.g. with or without grouping of the set of object definitions into the first and second groups.

The object definitions may, for example, correspond to classes of objects and conducting object classification may comprise detecting and/or recognising, in the image data 110, objects belonging to a variety of classes of objects. For example, the first object classifier 130 may be used to detect the presence of a human face in an image frame, or an animal in the image frame. In some cases, the first object classifier 130 identifies particular instances of an object in the image frame. For example, a coarse-level object definition may define a human faces class and a finer-level object definition may define an individual face class for identifying a particular human face. As a further example, a coarse-level object definition may define a four-legged animal class and a finer-level object definition may relate to a four-legged animal species class for identifying a particular species of four-legged animal. Further levels of object definitions may be included, for example an individual four-legged animal class, for identifying a particular four-legged animal, may belong to a yet-finer level of object definitions.

In examples in which the set of object definitions is arranged in an object definition hierarchy including a first group of coarse-level object definitions and a second group of finer-level object definitions, the first group of object definitions may include different coarse-level object definitions, e.g. both the human face class and the four-legged animal class. The second group of object definitions may include different finer-level object definitions, for example both the individual face class and the four-legged animal species class and/or the individual four-legged animal class.

An example hierarchy for a general-purpose set of object definitions may include one or more of the following classes and subclasses:

Animal
  a. 2 legged
    i. Human
      1 . . . sub-classes (see below)
  b. 4 legged
    i. Feline
    ii. Canine
    iii. Equine
      1. Horse
      2. Zebra
    iv. Elephantidae
      1. African bush
      2. African forest
      3. Asian
  c. 6 legged
    i. Ant
    ii. Beetle
    iii. Cockroach
  d. 8 legged
    i. Scorpion
    ii. Spider
      1. Tarantula
      2. Widow spider
  e. Fish
Mineral
  f. Gems
  g. Rocks
Vegetable
  h. Tree
    i. Evergreen
  i. Flower
  j. Bush
  k. Herb
Man made
  l. Furniture
    i. Chair
      1. Three leg chair
        a. Specific chair
      2. Four leg chair
    ii. Table
  m. White goods
    i. Refrigerator
    ii. Washing machine
  n. Painting
    i. Artist
      1. Specific painting by artist
  o. Car
    i. Manufacturer
      1. Model
        a. Year An example set of finer-level object definitions for recognising a particular human individual may include one or more of the following subclasses:

1. Male/female
2. Eye colour (e.g. 3 groups)
3. Estimated age group (e.g. 4 groups)
4. Skin colour (e.g. 4 groups)
5. Face shape (e.g. 4 groups)
6. Height (e.g. 4 groups)

In the above examples, not all the classes may be detected even when detecting an individual with such characteristics.

For example if a person is wearing dark glasses, the colour of the eyes may not be available.

The first object classifier 130 is arranged to detect an object in the image frame and to determine whether to transmit image data for the detected object to a second, remote, object classifier 150. For example, the first object classifier 130 may be arranged to determine that the detected object does not have a predetermined correspondence with an object definition in the set of object definitions. The first object classifier 130 may execute the set of object definitions, in the form of object classes, to detect the presence of objects conforming to the object classes in the first image data 110. A respective confidence level, or probability, may be determined for each of the object definitions, wherein the confidence level for a given object class represents a probability that the image frame includes an object belonging to the given class. As an example, the first object classifier 130 may execute the Elephantidae, Fish, and Tree object classes from the hierarchy above on the first image data 110 and return respective (normalised) confidence levels of [Elephantidae: 0.87, Fish: 0.11, Tree: 0.79]. Thus, the most probable object present in the image frame, as determined by the first object classifier 130 based on the executed object classes, is an elephant in this example; followed by a tree and then a fish (which is determined as the least likely to be present from the set).

Determining whether the detected object has, or does not have, a predetermined correspondence with a given object definition may involve comparing the confidence level determined for the given object definition (e.g. by the first object classifier 130) with a predetermined threshold. For example, if the determined confidence level has a predetermined relationship with (e.g. is greater than or equal to) a predetermined threshold, this may indicate that the detected object has the predetermined correspondence with the given object definition. In other cases, the determined confidence level being within a predetermined range of values may indicate that the detected object has the predetermined correspondence with the given object definition. In yet further cases, the object definition having the highest determined confidence level of the set of object definitions may be selected as having the predetermined correspondence with the detected object.

In examples, the first object classifier 130 may be arranged to determine whether to transmit image data for the detected object to the second object classifier by selecting a subset of the set of object definitions, and determining whether the detected object has a predetermined correspondence with an object definition in the subset of object definitions. For example, in this way the first object classifier 130 may be arranged to determine that the detected object does not have a predetermined correspondence with an object definition in the set of object definitions. For example, the first object classifier 130 may not always use the full set of object definitions and instead may use a subset thereof, which can reduce memory and/or processing demands of the object classification. For example, the first object classifier 130 may be arranged to select the subset of object definitions based on a most recently used scheme. In such cases, the subset of object definitions may comprise a predetermined number of object definitions selected based on a ranking of how recently each given object definition returned a predetermined correspondence with a previously detected object (e.g. in a previous processed image frame).

In examples, the first object classifier 130 is arranged to select the subset of object definitions in response to an indication that a value representative of an availability of a system resource of the image processing system 100 has a predetermined relationship with a predetermined threshold value for the system resource. In some cases, a size of the subset (e.g. a number of object definitions) selected may be based on the value representative of the availability of the system resource.

For example, the system resource may correspond to the storage 140 such that the availability of the system resource comprises an available capacity of the storage 140. The available capacity of the storage 140 may correspond to an amount of available, e.g. unused, storage (as part of the storage 140) that is accessible to the first object classifier 130.

Other examples of the availability of the system resource include: an amount of processor usage available to the image processing system 100; an amount of electrical power available to the image processing system 100; and an amount of bandwidth available to at least one processor configured to implement the first object classifier 130. For example, the image processing system 100 may comprise the at least one processor. The image processing system 100 may comprise additional components, in examples. The image processing system 100 may have a limited bandwidth, e.g. a maximum amount of data that can be transmitted by the image processing system 100 in a fixed amount of time. The amount of bandwidth available to the at least one processor configured to implement the first object classifier 130 may thus be limited, and may vary, in examples. For example, if other components of the image processing system 100 are active, less bandwidth may be available to the at least one processor.

The predetermined relationship may include the system resource availability being less than, less than or equal to, equal to, greater than or equal to, or greater than the threshold value.

As an example, an indication that an available capacity of the storage 140 is below the storage capacity threshold value may trigger the first object classifier 130 to select the subset of object definitions for executing during object classification.

In some examples, the determination by the first (local) classifier 130 as to whether to transmit image data for the detected object to the second (remote) classifier 150 may be based on such an indication that an availability of a given system resource has a predetermined relationship with a given threshold value for the system resource. For example, an indication that an amount of electrical power available to the image processing system 100 (e.g. by an electric battery arranged to power the image processing system 100) is below a given electrical power threshold value may at least contribute to a triggering of the first object classifier 130 to transmit the second image data to the second object classifier 150.

The determination by the first (local) classifier 130 as to whether to transmit image data for the detected object to the second (remote) classifier 150 may additionally or alternatively be based on an associated power usage of a communication channel between the first and second classifiers 130, 150. For example, different types of communication channels may correspond respectively to different predetermined threshold values of system resources. For example, a first type of communication channel (e.g. a Wi-Fi or Ethernet connection) may set a different corresponding system resource threshold value, e.g. electrical power threshold value, than a second type of communication channel (e.g. a 3G or 4G cellular network connection) having a higher associated power consumption than the first type of communication channel. Thus, at a given availability of electrical power to the image processing system 100 comprising the first classifier 130, the first (local) classifier 130 may determine whether to transmit image data for the detected object to the second (remote) classifier 150 differently depending on the type of communication channel between the first and second classifiers 130, 150.

As described above, the set of object definitions may be arranged in an object definition hierarchy, including at least a first group of coarse-level object definitions at a first object definition level and a second group of finer-level object definitions at a second object definition level below the first object definition level. In such cases, determining whether to transmit image data for the detected object to the second, remote, object classifier 150 may involve determining that the detected object does not have a predetermined correspondence with an object definition in the second group of finer-level object definitions.

For example, in some cases the first object classifier 130 may detect an object and classify the object at the first object definition level, e.g. as a car, but not classify the car manufacture in the second object definition level (e.g. because no car manufacturer subclasses are available to the first object classifier 130, or because the detected car object does not have a predetermined correspondence with any of the car manufacturer subclasses which are available). On determining that the detected car object does not have a predetermined correspondence with a car manufacturer object definition in the second group of finer-level object definitions, the first object classifier 130 may thus determine to transmit the second image data 160 to the second object classifier 150.

The first object classifier 130 may execute the set of object classes (or a selected subset thereof) in accordance with the hierarchy. For example, the object classes at the highest object definition level which are available to the first object classifier 130 may be executed first, followed by those classes at the next lowest object definition level, and so on down the hierarchy. For example, in the case above, the first object classifier 130 may execute the Furniture, White goods, Painting, and Car classes in a first object classification cycle, followed by any available sub classes thereof in a subsequent object classification cycle. In examples, the first object classifier 130 may execute subclasses based on a result of object classification in the object definition level above. For example, the first object classifier 130 may execute the Furniture, White goods, Painting, and Car classes on the image frame and determine that the detected object has a predetermined correspondence with the Car class. Based on said determination, the first object classifier 130 may execute the subclasses of the Car class first, e.g. any Manufacturer object definitions available thereto, and in some cases may not execute the subclasses of the other classes for which the classifier 130 did not determine that the detected object has a predetermined correspondence therewith.

In response to determining whether to transmit the image data for the detected object, the first object classifier 130 is arranged to transmit second image data 160, derived from the first image data 110, to the second object classifier 150. For example, the second object classifier 150 may be communicatively coupled to the first object classifier 130, e.g. via a direct communications channel or a communications network.

The first object classifier 130 is also arranged to receive object data 170, representative of the detected object, from the second object classifier 150. The object data 170 received from the second object classifier 150 may provide an indication of whether the second object classifier 150 has classified the detected object, in the second image data 160, as belonging to a predetermined class, e.g. as corresponding with a predetermined object definition.

The storage 140 accessible by the first object classifier 130 may comprise a first storage 140, and the remote second object classifier 150 may access a second storage 180 holding further categorization data 185. For example, the set of object definitions held by the first storage 140, and accessible by the first object classifier 130 as the categorization data 145, may comprise a first set of object definitions, and the further categorization data 185 may comprise a second set of object definitions accessible to the second object classifier 150. The second set of object definitions may be larger than the first set. For example, the first set of object definitions may be a subset of the second set of object definitions. The first object classifier 130, e.g. implemented on a local device, may have less storage available thereto compared to the second object classifier 150, which is implemented remotely. Thus, fewer object definitions may form the first set of object definitions than the second set stored remotely in the further categorization data 185.

The object data 170 received by the first object classifier 130 may include one or more object definitions which represent objects that the second object classifier 150 has determined are present in the second image data 160. The object data 170 may be considered to contain the 'result' of object classification, as determined by the second object classifier 150, for example.

Object data may be determined based on one or more probabilities, determined by a given object classifier, that the processed image data includes respective one or more objects belonging to corresponding classes. As an example, the second object classifier 150 may process the second image data 160 and determine the following probabilities corresponding to object definitions 'dog', 'cat' and 'car': dog=0.80; cat=0.75; car=0.85. The object data 170 transmitted back to the first object classifier 130 may contain the object definition corresponding to the highest determined probability, e.g. "car" in this example. In other examples, the object data 170 may include each object definition having a corresponding determined probability which has a predetermined relationship with a predetermined threshold value. For example, were the predetermined threshold value equal to 0.80, and the predetermined relationship involved the determined probability being 'greater than or equal to' the predetermined threshold value, the object data 170 may contain the object definitions: "dog" and "car" in this example. In further examples, the object data 170 may include each object definition having a corresponding determined probability that is non-zero, e.g. 'dog', 'cat' and 'car' in this example.

In examples, the object data 170, which the first object classifier 130 is arranged to receive from the second object classifier 150, is different to any object data which is currently available using the first set of object definitions accessible to the first object classifier 130. For example, since the second object classifier 150 may be able to access and execute a second set of object definitions which may be different (e.g. larger in number) than the first set of object definitions available to the first object classifier 130, the second object classifier 150 may classify objects which the first classifier 130 is not able to. Thus, the object data 170 may be representative of an object that the first object classifier 130 would not be able to classify, since the corresponding object definition was not available to the first object classifier 130 as part of the first set of object definitions. As an example, the first object classifier 130 may detect an object and classify the object as a dog, but may not be able classify the breed of dog (e.g. because no subclasses of the dog class, corresponding to breeds of dog, are available to the first object classifier 130, or because the detected dog object does not have a predetermined correspondence with any of the dog subclasses which are available). On failing to classify the dog object in the subclasses of the 'dog' class, the first object classifier 130 may transmit second image data 160 to the second object classifier 150. The second object classifier 150 may be able to access the full hierarchy of object classes which are stored in the remote storage 180. For example, the second object classifier 150 may be able to execute a range of subclasses of the 'dog' class which are unavailable to the first object classifier 130. The second object classifier 150 may proceed to classify the dog object as belonging to the 'Jack Russell Terrier' subclass. Thus, the object data 170 transmitted to the first classifier 130 may comprise the label of the identified subclass: "Jack Russell Terrier" and optionally the corresponding confidence level, e.g. 0.87, as determined by the second classifier 150. The first object classifier 130, not being able to execute the 'Jack Russell Terrier' subclass during the initial object classification, would not have been able to generate the same object data 170 as that received from the second object classifier 150.

In examples, the first object classifier 130 is arranged to receive from the second object classifier 150, in addition to the object data 170, second categorization data comprising an object definition corresponding to the detected object. In some cases, the first object classifier 130 is arranged to update the first categorization data 145 by including the received object definition in the set of object definitions. Thus, when performing object classification thereafter, the first object classifier 130 can execute the object definition corresponding to the previously detected object as part of the set of object definitions available to the first object classifier 130. This may reduce the likelihood that the first classifier 130 transmits image data remotely to the second object classifier 150 for further classification to be performed, and consequently waits for a result to be returned, since objects corresponding to the received object definition can be classified locally by the first object classifier 130 in subsequent image frames.

The first object classifier 130 may be arranged to update the first categorization data 145 by replacing an existing object definition in the set of object definitions with the received object definition. For example, the first object classifier 130 may employ a one in, one out policy with regards to the first set of object definitions stored as the first categorization data. Such a policy may be implemented in response to particular circumstances. For example, an indication that an available capacity of the storage has a predetermined relationship with a predetermined storage capacity threshold value may trigger the first object classifier 130 to replace existing object definitions with those received from the second object classifier 150. In some cases, the predetermined storage capacity threshold value may be a second predetermined storage capacity threshold value. For example, some examples described above involve an indication that a value representative of an availability of a system resource of the image processing system has a predetermined relationship with a predetermined threshold value for the system resource. In certain cases, the system resource may comprise an available capacity of the storage 140, as described, and the predetermined threshold value for the system resource may comprise a first predetermined storage capacity threshold value. In such cases in which there are first and second predetermined storage capacity threshold values, the second predetermined storage capacity threshold value may be the same as the first storage capacity threshold value. In other examples in which both first and second predetermined storage capacity threshold values are used, the two threshold values may be separately and independently predetermined.

In examples in which stored object definitions are replaced by received object definitions, the existing object definition to be replaced may be determined based on a least recently used scheme. For example, the currently stored set of object definitions may be ranked by how recently each object definition was executed and/or how recently it was determined that each object definition had a predetermined correspondence with a detected object in a given image. The object definition with the lowest ranking (i.e. corresponding to the longest time period) may be replaced on receiving the new object definition from the second object classifier 150.

In examples, the first object classifier 130 comprises a neural network. A neural network typically includes a number of interconnected nodes, which may be referred to as artificial neurons, or neurons. The internal state of a neuron (sometimes referred to as an "activation" of the neuron) typically depends on an input received by the neuron. The output of the neuron may then depend on the input, a weight, a bias and an activation function. The output of some neurons is connected to the input of other neurons, forming a directed, weighted graph in which vertices (corresponding to neurons) or edges (corresponding to connections) of the graph are associated with weights, respectively. The neurons may be arranged in layers such that information may flow from a given neuron in one layer to one or more neurons in a successive layer of the neural network. Examples include an object classifier executing in a neural network accelerator.

Figure 2:
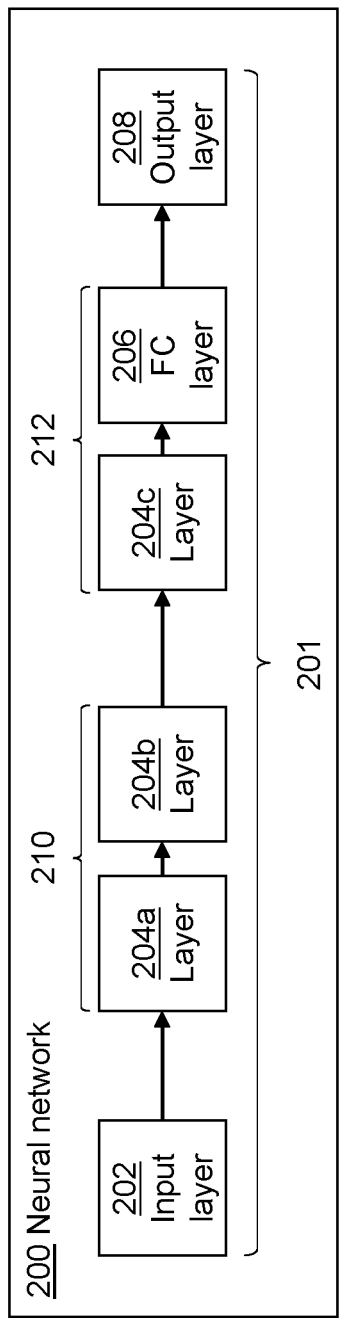
FIG. 2 schematically shows a neural network system according to examples.

FIG. 2 schematically shows a neural network system 200 according to examples. The neural network system 200 comprises a plurality of layers 201. In FIG. 2, the neural network 200 is a convolutional neural network (CNN). An example of a CNN is the VGG-16 CNN, although other CNNs may be used instead. A typical CNN includes an input layer 202, a plurality of convolutional layers (three of which, 204a, 204b, 204c, are shown in FIG. 2), at least one fully connected layer (one of which, 206, is shown in FIG. 2) and an output layer 208. The input layer 202 for example corresponds with an input to the neural network 200, which in this example is image data. The image data is for example 224 pixels wide and 224 pixels high and includes 3 colour channels (such as a red, green and blue colour channel). The convolutional layers typically extract particular features from the input data, to create feature maps. The fully connected layers then use the feature maps for classification. The fully connected layers execute the object definitions described above, in the form of object classes, to detect the presence of objects conforming to the object classes in the image data. The object definitions are selectively retrieved from storage, and loaded into the object classifier for use during object classification.

In examples in accordance with FIG. 2, the output of the layer 204a undergoes pooling before it is input to the layer 204b. Pooling for example allows values for a region of an image or a feature map to be aggregated or combined, for example by taking the highest value within a region. For example, with 2×2 max pooling, the highest value of the output of the layer 204a within a 2×2 patch of the feature map output from the layer 204a is used as an input to the layer 204b, rather than transferring the entire output of the layer 204a to the layer 204b. This reduces the amount of computation for subsequent layers of the neural network 200. Further pooling may be performed between other layers of the neural network 200. Conversely, pooling may be omitted in some cases. It is to be appreciated that the neural network 200 of FIG. 2 has been greatly simplified for ease of illustration and that typical neural networks may be significantly more complex.

In general, neural network systems such as the neural network 200 of FIG. 2 may undergo what is referred to as a "training phase", in which the neural network is trained for a particular purpose. As described, a neural network typically includes a number of interconnected neurons forming a directed, weighted graph in which vertices (corresponding to neurons) or edges (corresponding to connections) of the graph are associated with weights, respectively. The weights may be adjusted throughout training, altering the output of individual neurons and hence of the neural network as a whole. In a CNN, a fully connected layer typically connects every neuron in one layer to every neuron in another layer, and may therefore be used to identify overall characteristics of an image, such as whether the image includes an object of a particular class, or a particular instance belonging to the particular class.

In the example of FIG. 2, the neural network 200 has been trained to perform object detection by processing image data, for example to determine whether an object of a predetermined class of objects is present in the image represented by the image data (although in other examples the neural network 200 may have been trained to identify other image characteristics of the image instead). Training the neural network 200 in this way for example generates one or more kernels associated with at least some of the layers (such as layers of the neural network 200 other than the input layer 202 and the output layer 208). Hence, the output of the training may be a plurality of kernels associated with a predetermined neural network architecture (for example with different kernels being associated with different respective layers of a multi-layer neural network architecture). The kernel data may be considered to correspond to weight data representative of weights to be applied to image data, as each element of a kernel may be considered to correspond to a weight, respectively. Each of these weights may be multiplied by a corresponding pixel value of an image patch, to convolve the kernel with the image patch as described below.

The kernels may allow features of an image to be identified. For example, some of the kernels may be used to identify edges in the image represented by the image data and others may be used to identify horizontal or vertical features in the image (although this is not limiting, and other kernels are possible). The precise features that the kernels identify may depend on the image characteristics, such as the class of objects, that the neural network 200 is trained to detect. The kernels may be of any size. As an example, each kernel may be a 3×3 matrix, which may be convolved with the image data with a stride of 1. The kernels may be convolved with an image patch (or a feature map obtained by convolution of a kernel with an image patch) to identify the feature the kernel is designed to detect. Convolution generally involves multiplying each pixel of an image patch (in this example a 3×3 image patch), or each element of a feature map, by a weight in the kernel before adding the result of this operation to the result of the same operation applied to neighbouring pixels or neighbouring feature map elements. A stride for example refers to the number of pixels or feature map elements a kernel is moved by between each operation. A stride of 1 therefore indicates that, after calculating the convolution for a given 3×3 image patch, the kernel is slid across the image by 1 pixel and the convolution is calculated for a subsequent image patch. This process may be repeated until the kernel has been convolved with the entirety of the image (or the entire portion of the image for which a convolution is to be calculated), or with the entirety of a feature map the kernel is to be convolved with. A kernel may sometimes be referred to as a filter kernel or a filter. A convolution generally involves a multiplication operation and an addition operation (sometimes referred to as a multiply accumulate operation). Thus, a neural network accelerator configured to implement a neural network may include a multiplier-accumulator (MAC) unit configured to perform these operations.

After the training phase, the neural network 200 (which may be referred to as a trained neural network 200) may be used to detect the presence of objects of a predetermined class of objects in input images. This process may be referred to as "classification" or "inference". Classification typically involves convolution of the kernels obtained during the training phase with image patches of the image input to the neural network 200 to generate a feature map. The feature map may then be processed using at least one fully connected layer to classify the image.

In the example of FIG. 2, the layer 204a involves the convolution of 64 different kernels with the image data of the input layer 202. Each of the 64 kernels is, for example, arranged to identify a different respective feature of the image data. In an illustrative example in which the image data is 224×224 pixels in size, with 3 colour channels, and is convolved with 64 kernels of a size of 3×3 pixels, the layer 204a of the neural network 200 involves 224×224×3×(3× 3)×64 multiply-accumulate operations, i.e. 86 million multiply-accumulate operations. There will also be a large number of further multiply-accumulate operations associated with each of the further layers 204b, 204c, 206 of the neural network 200. As will be appreciated, though, other neural networks may involve convolutions with a different number of kernels. Nevertheless, processing an image to identify an image characteristic such as the presence of an object of a predetermined class, or a particular instance of the object, typically involves a large number of data processing operations, each of which consumes power.

In the example of FIG. 2, image data received by the input layer 202 of the neural network 200 is processed using layers 204a, 204b, 204c to generate feature data representative of at least one feature of the image frame. The feature data may represent a feature map, which may be output from a convolutional layer of a CNN such as the neural network 200 of FIG. 2. There may be more or fewer layers in the neural network 200 than those shown in FIG. 2. In examples in which the neural network 200 includes a plurality of layers 204a, 204b, 204c between the input layer 202 and the fully connected layer 206 and/or the output layer 208, as shown in FIG. 2, each of the said plurality of layers 204a, 204b, 204c may be used to generate intermediate feature data representative of at least one feature of the image. The intermediate feature data output from one of the layers (e.g. layer 204a) may be input to a subsequent layer of the neural network 200 (e.g. layer 204b) to identify further features of the image represented by the image data input to the neural network 200.

Although not shown in FIG. 2, it is to be appreciated that further processing may be applied to the image data after it has been obtained by an image sensor and before it is processed by the layers of the neural network 200. Said further processing may be performed by other components of an image processing system or as part of the neural network 200 itself.

In examples in which the neural network 200 is a CNN, as in FIG. 2, at least one layer of the neural network 200 (in this example, each of the layers 204a, 204b, 204c) may be a convolutional layer, respectively. The neural network 200 also includes a fully connected layer 206, which in FIG. 2 is arranged to receive output feature data from the convolutional layer 204c, which for example represents an output feature map, and to process the output feature data to generate object data. The object data for example corresponds with the output layer 208 of the neural network 200. The object data generated by the fully connected layer 206 may provide an indication of whether the neural network 200 has detected the presence of an object of a predetermined class in the image represented by the image data, as described examples above. In FIG. 2, the neural network 200 includes solely one fully connected layer 206. However, in other examples, the neural network 200 may include a plurality of fully connected layers, with an output of one of the fully connected layers being received as an input by a subsequent fully connected layer.

The plurality of layers 201 of the first neural network includes a first subset of layers 210 arranged to process image data, received as the input layer 202, to generate intermediate feature data representative of at least one feature in the image frame represented by the image data. For example, the first two convolutional layers 204a, 204b of the convolutional neural network 200 are part of the first subset 210 in this example. In some examples in which the neural network 200 is a CNN, each layer of the first subset 210 may be a convolutional layer, as in FIG. 2.

As shown in FIG. 2, the plurality of layers 201 also includes a second subset of layers 212 arranged to process the intermediate feature data, generated by the first subset of layers 210, to determine whether the detected object has a predetermined correspondence with an object definition in the set of object definitions. In this example, the second subset 212 comprises the sole fully connected layer 206 of the neural network 200. The third convolutional layer 204c of the neural network 200 is also part of the second subset of layers 212 in the example of FIG. 2. In other examples, the second subset 212 may include a plurality of fully connected layers 206, as described in examples of CNNs above.

As described above, the one or more fully connected layers 206 can execute the object definitions from the set of object definitions, in the form of object classes, to detect the presence of objects conforming to the object classes in the image data. In examples, the object definitions of the set of object definitions may thus correspond respectively to the one or more fully connected layers 206 of the second subset 212. The object definitions may therefore be selectively loaded into the first object classifier 130, for use during object classification, by configuring the corresponding one or more fully connected layers 206 in the second subset of layers 212 in the neural network 200.

In examples, referring back to FIG. 1, the first image data 110 received by the image data interface 120 may comprise first feature data representative of at least one feature in the image frame. For example, initial image data representative of the image frame, e.g. as captured by an image sensor, may be processed using a feature extraction system (e.g. a different neural network) to generate the first feature data (and optionally pre-processed) prior to being received as the first image data 110 by the image data interface 120, and subsequently processed by the first object classifier 130 as described herein.

In examples, the second image data 160 transmitted to the remote object classifier 150 comprises second feature data derived from the first image data 110 using the first object classifier 130. For example, the first object classifier 130 may transmit intermediate feature data generated by one or more of the convolutional layers 204a-c in examples in which the first object classifier 130 comprises a neural network 200. The feature data, derived from the first image data 110, may be transmitted to the remote classifier 150 in addition to the first image data 110, or a modified version thereof, in some examples.

In examples, the first object classifier 130 is arranged to determine a location of the detected object in the image frame. For example, the first image data 110 may be further processed to determine the location of the detected object in the image frame, after processing the first image data 110 using the first object classifier 130 (e.g. the neural network 200) to detect the object in the image frame. In other examples, the processing to determine the location of the detected object in the image frame may be performed as part of, or simultaneously to, the processing of the first image data 110 to initially detect the object in the image frame.

The first object classifier 130 may define a portion of the image frame on the basis of the determined location. For example, based on the location of the detected object in the image frame, and e.g. its dimensions, the first object classifier 130 may define the portion such that the portion contains the detected object.

The second image data 160, for transmitting to the second object classifier 150, may be derived based on the defined portion of the image frame. For example the first object classifier 130 may crop the image frame to include the defined portion and discard the remainder of the image frame. The cropped version of the image frame (or intermediate feature data derived therefrom) may be transmitted as the second image data 160, for example.

In examples, the first object classifier 130 may be arranged to determine the location of the detected object in the image frame using a deconvolutional network. For example, the deconvolutional network may be implemented to process data generated by the first object classifier 130 via the processing of the first image data 110.

A deconvolutional neural network (a type of neural network also known as a "deconvolutional network" or a "transposed convolutional neural network") may be considered to be an inverse convolutional neural network, e.g. a neural network arranged to perform an inverse convolutional model.

The deconvolutional neural network may include an input layer, e.g. which corresponds with an input to the deconvolutional neural network. In examples, the input to the deconvolutional neural network comprises object data output by a convolutional neural network, e.g. which may correspond to the neural network 200 of FIG. 2 described above—the corresponding description applies accordingly.

The deconvolutional neural network may also include a fully connected layer, deconvolutional layers, and an output layer. The output of the input layer may undergo unpooling before it is input to a second layer. Unpooling for example operates to substantially reverse the pooling applied by the convolutional neural network 200. For example, unpooling may allow previously aggregated or combined values for a region of an image or a feature map to be uncombined. Further unpooling may be performed between the second layer and subsequent layers.

A deconvolutional neural network may be trained, as described previously, for a particular purpose. Weights associated with neurons, or connections between neurons, of the deconvolutional neural network may be adjusted throughout training, altering the output of individual neurons and hence of the neural network as a whole. For example, the deconvolutional neural network may be trained to determine a location of an identified object in an image frame based on obtained object data associated with the image. Kernels may be deconvolved with image data (e.g. object data, feature data) input to a layer of the deconvolutional neural network. For example, the deconvolutional layers of the deconvolutional neural network may be arranged to apply deconvolution operations on the data received thereby in order to localise the object detected by the convolutional neural network 200. The output layer of the deconvolutional neural network may correspond to a location, e.g. a region, of the image or feature map that is determined, e.g. estimated, to contain the detected object.

In examples, the convolutional neural network 200 has a first plurality of layers 201, and the deconvolutional neural network has a second plurality of layers corresponding to the first plurality of layers 201. For example, at least some of the second plurality of layers may be derivable based on a corresponding layer of the first plurality of layers 201. For example, at least some of the deconvolutional layers may be respective transposed versions of convolutional layers. The deconvolutional neural network may be considered to mirror the convolutional neural network 200 in its structure and/or processing. In other examples, the deconvolutional neural network may comprise more or fewer layers than the convolutional neural network 200. In some examples, the deconvolutional neural network may have a structure that is not based on that of the convolutional neural network 200.

In some examples, as previously described, the second image data 160 transmitted by the first object classifier 130 comprises feature data, e.g. a feature map, generated by a given convolutional layer of the convolutional neural network 200. In such cases, the deconvolutional neural network may have layers corresponding to the given convolutional layer, and subsequent layers, of the convolutional neural network 200.

In examples described above, the first object classifier 130 comprises a neural network, e.g. the CNN 200 of FIG. 2. In other examples, the first object classifier 130 may comprise a different type of classifier, e.g. a support vector machine (SVM), a relevance vector machine (RVM), a neural network (NN), a Bayes classifier, and a k-nearest neighbours (k-NN) classifier.

Similarly, different feature extraction operations may be implemented to process the first image data 110 and produce feature data therefrom. The feature data may comprise derived values, e.g. "features", determined based on the input image data 110. The feature extraction operation may thus involve extracting particular features from the input data to generate the feature data comprising one or more derived features. In examples, the feature data may comprise one or more "feature vectors", "feature maps", or "feature descriptors". In examples, the feature data produced as part of the feature extraction operation includes one or more histogram-of-oriented-gradients (HOG) descriptors. In other examples, the feature data includes one or more Haar (or "Haar-like") features, local binary patterns (LBP), scale-invariant feature transform (SIFT) features, gradient location and orientation histogram (GLOH) features and/or other feature types.

As previously described, an object detection operation may be performed, e.g. by an object classifier, using the generated feature data to determine whether an object of a particular class, or a specific object, is present in the image frame. The classifier may map the feature data, taken as input data, to a class or category of objects, for example. A neural network may be implemented to perform at least part of the feature extraction operation and/or the object detection operation in some examples.

Figure 3:
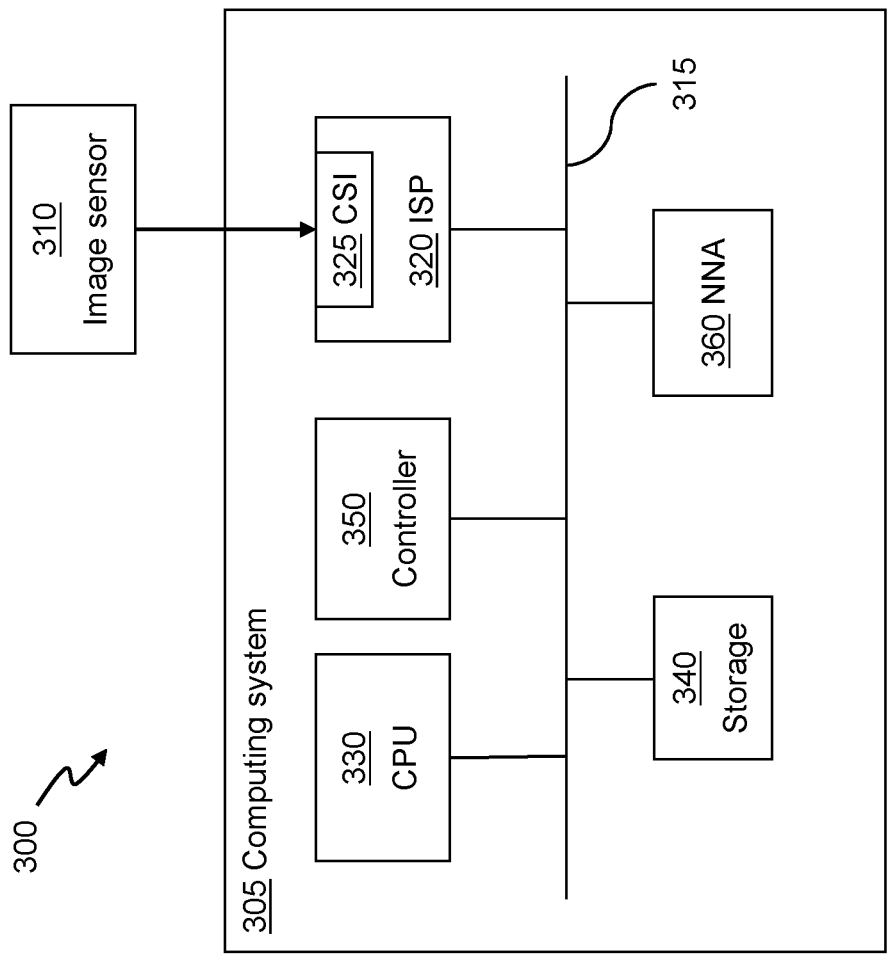
FIG. 3 schematically shows an example image processing system for use with the methods described herein.

FIG. 3 shows schematically a further example of an image processing system 300 for use with the methods described herein. The image processing system 300 of FIG. 3 may be coupled to or form part of a computer device, such as a personal computer, a laptop, a smartphone, a head mounted display (HMD), smart glasses e.g. augmented reality (AR) glasses, or an on-board computer device which may be coupled to or mounted within a vehicle such as a car.

The image processing system 300 of FIG. 3 includes an image sensor 310. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 310 in this example is arranged to capture image data representative of an image frame. The image frame may form part of a video, which is typically a series of images captured sequentially. For example, the image frame may correspond to a frame of a video.

In FIG. 3, the image sensor 310 is arranged to transfer image data to an image signal processor (ISP) 320 of a computing system 305 via a camera serial interface (CSI) 325. The ISP 320 may perform initial processing of the image data to prepare the image data for display. For example, the ISP 320 may perform saturation correction, renormalization, white balance adjustment and/or demosaicing, although this is not to be taken as limiting. The ISP 320 and/or the CSI 325 may correspond with the image data interface 120 described with reference to the image processing system 100 of FIG. 1 above, for examples.

The computing system 305 of FIG. 3 includes at least one processor. In this example, the computing system 305 includes a central processor unit (CPU) 330. The computing system 305 also includes at least one neural network accelerator (NNA) 360. A neural network accelerator is, for example, a processor dedicated to implementing at least classification of data using a neural network. The at least one neural network accelerator 360 is configured to implement a neural network such as that described above. The at least one neural network accelerator 360 may be a neural network accelerator (such as a single or sole neural network accelerator) configured to implement multiple neural networks.

In other examples, though, the computing system 305 may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system 305 may also or alternatively include a processor implemented as a combination of computing devices, e.g., a combination of a DSP and a microprocessor, a plurality of microprocessors, one or more microprocessors in conjunction with a DSP core, or any other such configuration. The image processing system 305 may also or alternatively include at least one graphics processing unit (GPU). The local object classifier, e.g. neural network, may be implemented by one or more of these other processors in examples.

The computing system 305 of FIG. 3 includes a controller 350. In accordance with the methods described herein, the controller 350 may be arranged to control the transmission and/or receipt of image data and/or object data between the local and remote classifiers. The controller 350 may form part of the local object classifier as described in examples above. The controller 350 may comprise hardware and/or software to control or configure the local classifier, e.g. neural network. For example, the controller 350 may be implemented at least in part by computer software stored in (non-transitory) memory and executable by a processor, or by hardware, or by a combination of tangibly stored software and hardware (and tangibly stored firmware). In some examples, the controller 350 includes a processor and a memory. Computer executable code that includes instructions for performing various operations of the controller described herein can be stored in the memory. For example, the functionality for controlling or interacting with the neural network can be implemented as executable neural network control code stored in the memory and executed by the processor. As such, the executable code stored in the memory can include instructions for operations that when executed by processor cause the processor to implement the functionality described in reference to the example controller 350.

In other examples, the controller 350 may additionally or alternatively comprise a driver as part of the CPU 330. The driver may provide an interface between software configured to control or configure the local object classifier, e.g. neural network, and the at least one processor, e.g. neural network accelerator, which is configured to perform the processing to implement the classifier. In other examples, though, the local object classifier may be implemented using a more general processor, such as the CPU or a GPU, as explained above.

The computing system 305 of FIG. 3 also includes storage 340. The storage 340 may correspond with the storage 140 in the example of FIG. 1, and the corresponding description applies. The storage 340 may be removable or non-removable from the computing system 305. The storage 340 is for example arranged to store image data representative of at least part of an image, which may be received from the ISP 320. In some examples, the computing system 305 of FIG. 3 also includes a dynamic memory controller (DMC) which may be used to control access to the storage 340 of the computing system 305.

The components of the computing system 305 in the example of FIG. 3 are interconnected using a systems bus 315. This allows data to be transferred between the various components. The bus 315 may be, or include, any suitable interface or bus. For example, an ARM® Advanced Microcontroller Bus Architecture (AMBA) interface, such as the Advanced eXtensible Interface (AXI), may be used.

The above examples are to be understood as illustrative examples. Further examples are envisaged. For example, although in examples described above the neural network is a CNN, in other examples other types of neural network may be used.

Furthermore, in some examples, there may be a plurality of remote classifiers arranged in a hierarchy, the hierarchy including the first, local, classifier 130. The different classifiers may have access to different respective sets of object definitions. In such cases, the transmission of image data from one classifier to another may be based on the hierarchy of classifiers. For example, the second, remote, object classifier 150 may determine whether to transmit image data for the detected object to a third, remote, object classifier in a similar way to that described for the first object classifier 130. Similarly, in response to said determining, the second classifier 150 may transmit further image data, e.g. derived from the first and/or second image data, to the third object classifier. The second classifier 150 may also receive further object data, representative of the detected object, from the third object classifier in a similar way to that previously described. Thus, in such examples, image data may be transferred from the first to the second classifier (based on a first determination by the first classifier), and then from the second classifier to the third classifier (based on a second determination by the second classifier) based on the hierarchy of the first, second and third classifiers. As an example, the first (local) classifier 130 may be comprised as part of a mobile device, the second (remote) classifier 150 may be comprised as part of an on-board computer device in a car, and the third (remote) classifier may be comprised as part of a server system communicatively coupled to the on-board computer of the car, and possibly also the mobile device. In such an example, first image data may be received at the mobile device, second image data may be transferred from the mobile device to the on-board computer of the car, and third image data may be transferred from the on-board computer of the car to the server system, based on respective determinations as to whether to transmit the respective image data between the respective classifiers of the respective devices.

In other examples, however, the first classifier may transmit image data to a plurality of remote object classifiers, e.g. to the second and third classifiers in the above example, rather than image data being transferred between the classifiers based on a hierarchy.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An image processing system comprising:
an image data interface arranged to receive first image data representative of an is frame;
a first, local, object classifier arranged to perform object classification in the image frame; and
storage arranged to store categorization data comprising a set of object definitions for use during object classification;
wherein the first object classifier is arranged to:
detect an object in the image frame;
determine whether to transmit image data for the detected object to a second, remote, object classifier, based on a determination that the detected object does not have a predetermined correspondence with an object definition in the set of object definitions;

in response to determining that the detected object does not have a predetermined correspondence with an object definition in the set of object definitions:
  transmit second image data, derived from the first image data, to the second, remote, object classifier; and
  receive object data, representative of the detected object, from the second, remote, object classifier.

2. An image processing system according to claim 1, wherein the first object classifier being arranged to determine whether to transmit image data for the detected object to the second object classifier comprises the first object classifier being arranged to:
  select a subset of the set of object, definitions; and
  determine whether the detected object has a predetermined correspondence with an object definition in the subset of object definitions.

3. An image processing system according to claim 2, wherein the first object classifier is arranged to select the subset of object definitions based on a most recently used scheme.

4. An image processing system according to claim 2, wherein the first object classifier is arranged to select the subset of the set of object definitions in response to an indication that a value representative of an availability of a system resource of the image processing system has a predetermined relationship with a predetermined threshold value for the system resource.

5. An image processing system according to claim 4, wherein the availability of the system resource comprises at least one of:
  an available capacity of the storage;
  an amount of processor usage available to the image processing system;
  an amount of electrical power available to the image processing system; and
  an amount of bandwidth available to at least one processor configured to implement the first object classifier.

6. An image processing system according to claim 1, wherein the first object classifier is arranged to:
  determine a location of the detected object in the image frame;
  define a portion of the image frame on the basis of the determined location; and
  derive the second image data, for transmitting to the second object classifier, based on the portion of the image frame.

7. An image processing system according to claim 1, wherein the first image data comprises first feature data representative of at least one feature in the image frame.

8. An image processing system according to claim 1, wherein the second image data comprises second feature data derived from the first image data using the object classifier.

9. An image processing system according to claim 1, wherein the object data, which the first object classifier is arranged to receive, is different to any object data which is currently available using the set of object definitions.

10. An image processing system according to claim 1, wherein the first object classifier is arranged to further receive second categorization data, comprising an object definition corresponding to the detected object, from the second object classifier.

11. An image processing system according to claim 10, wherein the first object classifier is arranged to update the first categorization data by at least one of:
  (a) including the received object definition in the set of object definitions; or
  (b) replacing an existing object definition in the set of object definitions with the received object definition.

12. An image processing system according to claim 11, in accordance with (b), wherein the existing object definition to be replaced is determined based on a least recently used scheme.

13. An image processing system according to claim 11, in accordance with (b), wherein the object classifier is arranged to replace the existing object definition in response to an indication that an available capacity of the storage has a predetermined relationship with a predetermined storage capacity threshold value.

14. An image processing system according to claim 1, wherein the first object classifier comprises a neural network having a plurality of layers comprising:
  a first subset arranged to process the first image data to generate intermediate feature data representative of at least one feature in the image; and
  a second subset arranged to process the intermediate feature data to determine whether the detected object has a predetermined correspondence with an object definition in the set of object definitions.

15. A method of image processing comprising:
  obtaining first image data representative of an image frame;
  storing categorization data comprising a set of object definitions for use during object classification;
  processing the first image data using a first, local, object, classifier to perform object classification in the image frame;
  detecting an object in the image frame;
  determining whether to transmit image data for the detected object to a second, remote, object classifier, based on a determination that the detected object does not have a predetermined correspondence with an object definition in the set of object definitions; and
  in response to determining that the detected object does not have a predetermined correspondence with an object definition in the set of object definitions:
    transmitting second image data, derived from the first image data, to the second, remote, object classifier; and
    receiving object data, representative of the detected object, from the second, remote, object classifier.

16. A method according to claim 15, wherein the set of object definitions are arranged in an object definition hierarchy and include at least a first group of coarse-level object definitions at a first object definition level and a second group of finer-level object definitions at a second object definition level which is below the first object, definition level.

17. A method according to claim 16, wherein the determining comprises determining that the detected object does not have a predetermined correspondence with an object definition in the second group of finer-level object definitions, and
  wherein the received object data is different to any object, data which is currently available using the second group of finer-level object definitions.

18. A non-transitory computer-readable storage medium storing instructions that, when executed by a processor, cause the processor to:
  receive first image data representative of an image frame;
  store first categorization data, comprising a set of object definitions for use during object classification, in storage;

process the first image data using a first, local, object classifier to perform object classification in the image frame;

detect an object in the image frame;

determine whether to transmit image data for the detected object to a second, remote, object classifier, based on a determination that the detected object does not have a predetermined correspondence with an object definition in the set of object definitions; and in response to determining that the detected object does not have a predetermined correspondence with an object definition in the set of object definition:

transmit second image data, derived from the first image data, to the second, remote, object classifier; and receive object data, representative of the detected object from the second, remote object classifier.

\* \* \* \* \*